United States Patent
Schini et al.

(10) Patent No.: US 10,731,784 B2
(45) Date of Patent: Aug. 4, 2020

(54) ACCUMULATOR INTEGRATED INTO A FUEL LINE

(71) Applicant: SAFRAN AIRCRAFT ENGINES, Paris (FR)

(72) Inventors: Yannick Schini, Paris (FR); Arnaud Baudran, Paris (FR); Eric Charles Pean, Samois sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 68 days.

(21) Appl. No.: 16/206,618

(22) Filed: Nov. 30, 2018

(65) Prior Publication Data
US 2019/0170096 A1 Jun. 6, 2019

(30) Foreign Application Priority Data

Dec. 1, 2017 (FR) ..................................... 17 61520

(51) Int. Cl.
*F16L 55/054* (2006.01)
*F02C 7/22* (2006.01)
(Continued)

(52) U.S. Cl.
CPC .............. *F16L 55/054* (2013.01); *F02C 7/22* (2013.01); *F02M 37/0041* (2013.01);
(Continued)

(58) Field of Classification Search
USPC .......................... 123/447; 138/26, 30, 37, 42
See application file for complete search history.

(56) References Cited

U.S. PATENT DOCUMENTS 2,609,001 A * 9/1952 Hebard .................. F16L 55/052
138/30
2,763,291 A * 9/1956 Snyder .................... F16L 55/04
138/26
(Continued)

FOREIGN PATENT DOCUMENTS

FR 1 149 443 A 12/1957
JP 06058487 A * 3/1994
WO 2015/016737 A1 2/2015

OTHER PUBLICATIONS

French Search Report dated Aug. 16, 2018 issued in French Application No. 1761520, filed Dec. 1, 2017, 6 pages.

*Primary Examiner* — Sizo B Vilakazi
*Assistant Examiner* — Brian R Kirby
(74) *Attorney, Agent, or Firm* — Christensen O'Connor Johnson Kindness PLLC

(57) ABSTRACT

A fuel pressure accumulator for a fuel supply circuit of a turbine engine having at least one pipe is provided. The fuel pressure accumulator generally includes at least one housing adjacent to said pipe and receiving at least one deformable enclosure confining a gas and having at least one movable wall in contact with the fuel in order to dampen a fuel overpressure, where the housing is coaxial with the pipe and the accumulator has a permeable chamber delimited at least partially by the housing, pressurizing the deformable enclosure and communicating with the main fuel flow via a grid with staged walls tilted, with respect to a direction of the flow flowing along the grid, substantially in the direction of the deformable enclosure.

10 Claims, 3 Drawing Sheets

(51) Int. Cl.
*F16L 55/053* (2006.01)
*F02M 37/00* (2006.01)
*F16L 55/045* (2006.01)
*F16L 55/052* (2006.01)
*F16L 55/04* (2006.01)
*F16L 55/02* (2006.01)

(52) U.S. Cl.
CPC ....... *F02M 37/0047* (2013.01); *F16L 55/053* (2013.01); *F16L 55/02* (2013.01); *F16L 55/04* (2013.01); *F16L 55/045* (2013.01); *F16L 55/052* (2013.01)

(56) References Cited

U.S. PATENT DOCUMENTS

| | | | | |
|---|---|---|---|---|
| 2,838,073 A | * | 6/1958 | Bruce | F16L 55/052 138/30 |
| 2,841,181 A | * | 7/1958 | Hewitt | F16L 55/054 138/30 |
| 2,918,090 A | * | 12/1959 | De Witt | F16L 55/052 138/30 |
| 3,061,039 A | * | 10/1962 | Peters | F16L 55/0337 181/233 |
| 3,165,123 A | * | 1/1965 | Hawkins | F15D 1/065 138/37 |
| 3,331,399 A | * | 7/1967 | Von Forell | F16L 55/052 138/30 |
| 3,342,210 A | * | 9/1967 | Renton | F16K 47/02 137/593 |
| 3,424,201 A | * | 1/1969 | Sugimura | F15B 1/10 138/30 |
| 3,654,964 A | * | 4/1972 | Mercier | F15B 1/14 138/30 |
| 4,186,775 A | * | 2/1980 | Muroi | F16L 55/054 138/26 |
| 4,600,035 A | * | 7/1986 | Sugimura | F16L 55/054 138/26 |
| 4,628,964 A | * | 12/1986 | Sugimura | F15B 1/16 138/30 |
| 4,638,838 A | * | 1/1987 | Richard | F15B 1/08 138/26 |
| 4,729,360 A | | 3/1988 | Fehrenbach et al. | |
| 4,732,175 A | * | 3/1988 | Pareja | F16L 55/05 138/26 |
| 4,821,777 A | * | 4/1989 | Martin | F16L 55/054 138/30 |
| 4,872,486 A | * | 10/1989 | Sugimura | F15B 1/10 138/30 |
| 4,911,204 A | | 3/1990 | Martin | |
| 5,659,158 A | * | 8/1997 | Browning | F01N 1/08 181/265 |
| 5,682,923 A | * | 11/1997 | Goloff | F16L 55/053 138/26 |
| 5,735,313 A | * | 4/1998 | Jenski, Jr. | F04B 11/0016 138/30 |
| 6,360,777 B1 | * | 3/2002 | Bae | F02M 55/04 138/129 |
| 6,478,052 B1 | * | 11/2002 | Conley | F16L 55/053 138/30 |
| 6,536,457 B2 | * | 3/2003 | Dooley | F02C 7/22 137/13 |
| 7,159,692 B1 | * | 1/2007 | Frederiksen | F01N 1/08 181/227 |
| 9,194,526 B2 | * | 11/2015 | Lindstrand | F24H 1/181 |
| 2005/0263198 A1 | * | 12/2005 | Kamada | F02M 37/0041 138/30 |

\* cited by examiner

ACCUMULATOR INTEGRATED INTO A FUEL LINE

BACKGROUND

During the operation of a turbine engine, it may occur that it is necessary to perform an emergency shutdown of the fuel supply. More specifically, in a two-spool bypass turbine engine, if ever the connection between the fan and the low pressure shaft that drives this fan is broken, the fan is no longer able to exert a resistive torque against this low pressure shaft. In this case, if the supply of fuel is not cut off quickly, the high pressure and low pressure bodies risk overspeeding, with the risk of having the blading discs of the turbine stages thereof break under the excessive centrifugal forces produced by the excessively high rotation speeds. The bursting of such a disc can cause much damage to the turbine engine and also even to the other parts of the aircraft. A system is therefore provided to quickly cut off the fuel supply and thus prevent turbine engine overspeeding.

Similarly, a thrust control defect of the turbine engine can result in a high thrust (UHT or "Uncontrolled High Thrust") which needs to be overcome by cutting off the fuel supply of the turbine engine.

Cutting off the supply is carried out generally by the closing of a valve arranged in a supply circuit that supplies a rail of injectors of the combustion chamber. This closing leads to an abrupt shutdown of the flow of fuel injected, which has the effect of producing a pressure wave that rises back along the supply circuit of the injectors in the direction opposite the normal direction of flow of the fuel and in the direction of the tanks of the aircraft.

The appearance of a pressure peak following the rise of this pressure wave to the tanks is not permitted as it would pose safety problems.

Conventionally, this disadvantage is overcome by equipping the fuel circuit with a fuel accumulator, arranged on a portion of the fuel circuit of the turbine engine, in order to absorb the energy produced by this pressure wave before it reaches the tanks.

Such an accumulator comprises a deformable enclosure, subjected to a pressurized gas, which is in contact with the fuel supply circuit via a connection pipe. In the event of an abrupt shutdown of the fuel supply, the pressure wave is passed into the connection pipe and compresses the deformable enclosure which then plays the role of a shock absorber, which has the effect of reducing the pressure peak in the supply circuit.

However, the effectiveness of such an accumulator is highly dependent on the installation thereof. Indeed, the longer and thinner the connection pipe is, the less effective the accumulator is. This problem is generally overcome by oversizing the accumulator, and even under these conditions, the latter is not always capable of performing a satisfactory dampening of the pressure peaks. Furthermore, oversizing the accumulator leads to an increase in the size thereof and to an increase in the mass thereof.

U.S. Pat. No. 4,729,360 describes a fuel accumulator with a deformable enclosure configured to confine in a sealed manner a gas, to reduce the pressure fluctuations in a fuel supply circuit of a vehicle. The housing that receives the deformable enclosure interrupts the pipe to form a bend with an upstream portion and a downstream portion of the pipe that is connected to the housing. The presence of this bend leads to the whole of the pipe being voluminous.

Supposing that the upstream and downstream portions of the pipe that are connected to the housing are aligned, the movable wall of the deformable enclosure will not be directed in the direction of the pressure wave that travels through the fuel pipe in the direction opposite the normal fuel flow. Consequently, this device cannot be, at the same time, not very voluminous and be capable of dampening such a wave with the maximum effectiveness.

Documents FR 1149443A and U.S. Pat. No. 4,911,204 describe fuel accumulators that operate according to a similar principle, and arranged coaxially with fuel circuit pipes. These accumulators comprise deformable enclosures housed in housings coaxial to the pipes, which communicate with these pipes via bores or ducts oriented radially with respect to the axis of the pipes. This configuration is not optimal, as it causes load losses in the pipes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, the present disclosure aims to overcome the disadvantages of an accumulator according to the state of the art by proposing an accumulator which is not only directly integrated into a pipe of the supply circuit, in the absence of a connection pipe, and which is fully stressed by a pressure wave propagating through the fuel in the opposite direction to the normal flow of the fuel, and which therefore does not cause any load loss in the pipe during the normal flow of the fuel.

For this purpose, the present disclosure proposes a fuel pressure accumulator for a fuel supply circuit of a turbine engine comprising at least one pipe wherein flows, from upstream to downstream, a main fuel flow, the accumulator comprising at least one housing configured to be adjacent to the pipe and receiving at least one deformable enclosure configured to confine, in a sealed manner, a gas subjected to a pressure equal to a nominal fuel pressure present in the pipe, the enclosure comprising at least one movable wall configured to be arranged in contact with the fuel and to be deformed under the effect of a fuel overpressure so that the gas confined in the enclosure, by being compressed, dampens the fuel overpressure, wherein the housing is coaxial with the pipe and in that the accumulator comprises a permeable chamber delimited at least partially by the housing, pressurizing the deformable enclosure, and communicating with the main fuel flow via a grid with staged walls which are tilted, with respect to a direction of the flow flowing along the grid, substantially in the direction of the deformable enclosure.

According to other characteristics of the pressure accumulator, singularly or in any combination:

(a) each tilted wall, projecting over the direction of the main flow flowing along the grid, covers at least one adjacent tilted wall and delimits with the adjacent tilted wall an opening rotated substantially in the direction of the deformable enclosure, (b) the deformable enclosure has a symmetry of rotation and is coaxial with the housing, (c) the housing is formed of a peripheral protrusion of the pipe extending from a main portion of the pipe, the peripheral protrusion comprising an upstream portion receiving the deformable enclosure and having an outer diameter greater than a diameter of the main portion of the pipe, and a downstream portion having a wall that converges in the downstream direction until joining a wall of the main portion of the pipe, the upstream and downstream portions delimiting the permeable chamber, and at least the downstream portion of the peripheral protrusion being separated from the main portion of the pipe by the grid with staged walls.

(d) the deformable enclosure comprises a torus made of elastomer material, and at least one valve for inflating the torus passes through the wall of the peripheral protrusion, (e) the deformable enclosure comprises a metal bellows in the shape of a crown that comprises at least one first fixed annular wall coinciding with an upstream wall of the upstream portion of the annular protrusion, the bellows further comprising a movable annular wall that is rotated towards the downstream portion, (f) the pressure accumulator comprises:
  (i) a casing housed at the center of a peripheral protrusion of the pipe, the casing comprising an upstream segment with an ogive shape, of which the conicity is rotated in the upstream direction and which is coaxial with the pipe, and a cylindrical downstream segment forming the housing receiving the deformable enclosure, and
  (ii) the grid with staged walls, which extends coaxially with the pipe by converging in the downstream direction from a downstream end of the downstream segment of the casing and with which it delimits the permeable chamber, (g) the deformable enclosure comprises a cylindrical metal bellows that comprises at least one fixed wall integral with an upstream end of the downstream segment and a movable wall which is rotated towards the permeable chamber.

The present disclosure also relates to a fuel pipe for a fuel supply circuit of a turbine engine comprising at least one pipe wherein flows, from upstream to downstream, a main fuel flow, comprising a pressure accumulator of the type described hereinabove.

The present disclosure finally relates to a fuel circuit for a turbine engine further comprising a fuel pipe of the type described hereinabove, of which at least one accumulator is arranged in the circuit according to a position wherein an upstream end of the pressure accumulator is arranged higher than a downstream end of the accumulator.

BRIEF DESCRIPTION OF THE FIGURES

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," "upstream," "downstream,' etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Figure 1:
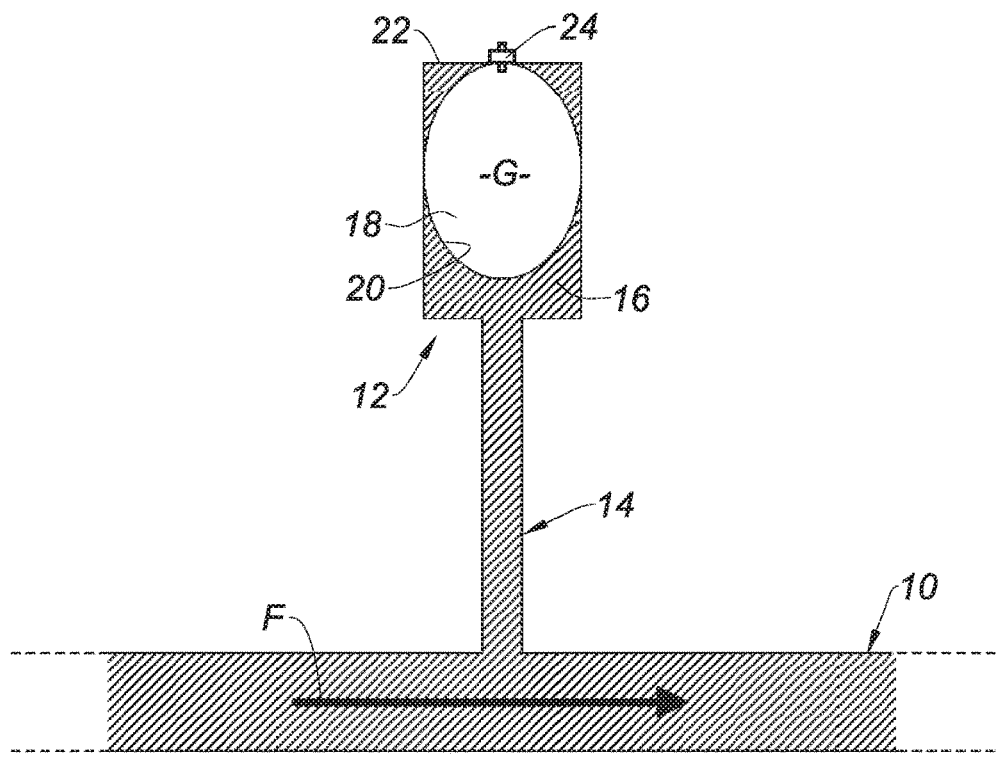
FIG. 1 is a schematic view of a fuel pipe comprising a fuel accumulator according to a first state of the prior art.
Figure 2:
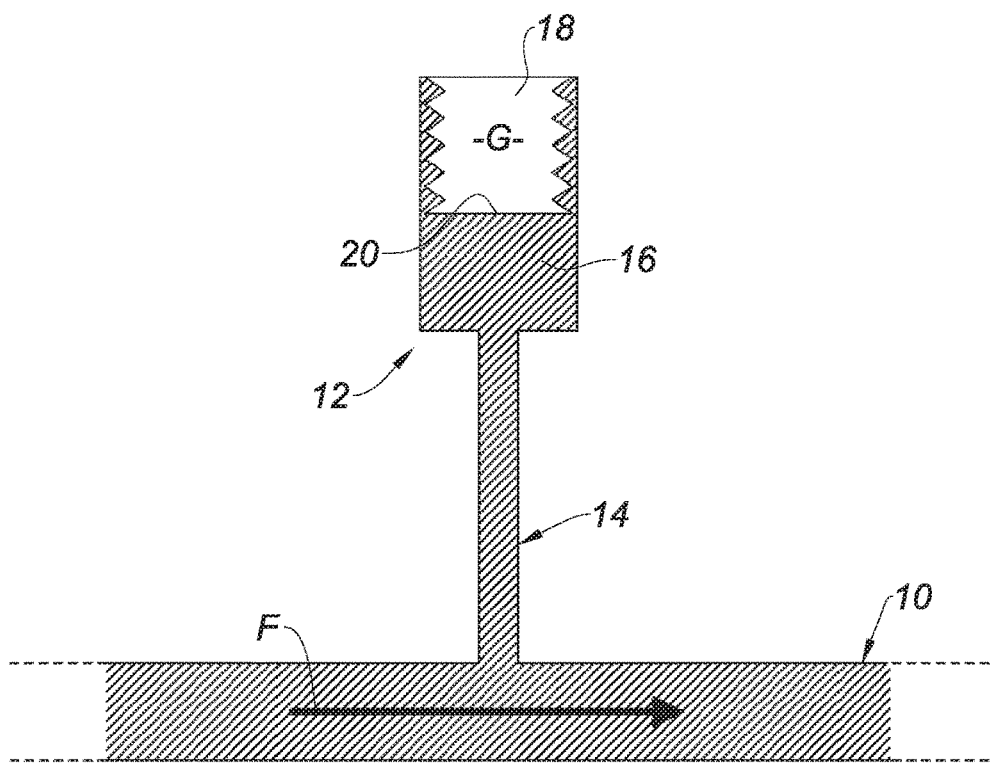
FIG. 2 is a schematic view of a fuel pipe comprising a fuel accumulator according to a second state of the prior art.

FIGS. 1 and 2 represent conventional fuel pipes 10. Each of these fuel pipes 10 is intended to be equipped in a fuel supply circuit (not shown) of a turbine engine, and in particular to supply a rail of injectors placed in the combustion chamber of the turbine engine.

In a normal operating configuration of the turbine engine corresponding to a supply of the injectors with fuel, a main fuel flow F flows from upstream to downstream in the pipe 10. Near the combustion chamber is arranged a valve for supplying the injectors (not shown), which is arranged as close as possible to the combustion chamber so as to limit the quantity of residual fuel between the valve and the combustion chamber in case of closing of said supply valve.

In case of a sudden shutdown of the fuel supply by the supply valve, a pressure wave is transmitted along the fuel pipe. To limit the effects of this pressure wave and prevent it from propagating with the full intensity thereof to the tank of the aircraft, a fuel accumulator 12 is arranged adjacently to the pipe 10 upstream of the supply valve.

Conventionally, this accumulator 12 is arranged at the end of a connection duct 14 which is derived from the fuel pipe 10.

Conventionally, the accumulator 12 comprises at least one housing 16 which is connected to the connection duct 14 and which is thereby located adjacent to the pipe 10. The housing 16 receives, according to a rather widespread embodiment of the state of the art, at least one deformable enclosure 18 that confines, in a sealed manner, a gas G. The gas G is introduced into the deformable enclosure 18 during the closing thereof at a pressure that is substantially equal to a nominal fuel pressure present in the pipe when the turbine engine is operating normally.

The deformable enclosure 18 comprises at least one movable wall 20 configured to be arranged in contact with the fuel and to be deformed under the effect of a fuel overpressure so that the gas G confined in the enclosure 18, by being compressed, dampens the fuel overpressure.

The deformable enclosure 18 can be carried out in different ways. For example, as illustrated in FIG. 1, the enclosure 18 can be carried out in the form of a balloon made of elastomer material which is contiguous with at least one wall 22 of the housing 16 and which comprises a valve 24, passing through said wall 22, which allows the inflating thereof at the suitable pressure. As illustrated in FIG. 2, the enclosure 18, as a variant, can be carried out in the form of a metal bellows which is inflated beforehand to the suitable pressure before the insertion thereof into the housing 16.

The pressure of the gas G contained in the enclosure 18 is selected substantially equal to the nominal fuel pressure present in the pipe under normal operation of the turbine engine such that the deformable enclosure 18 is instantaneously compressible in case of overpressure resulting from a pressure wave circulating in the pipe 10.

The foregoing design however has disadvantages. Firstly, as minimal as the length of the connection duct 14 is, this duct 14 is a source that reduces the transmission of the pressure wave between the pipe 10 and the accumulator 12, such that the overpressure resulting from the pressure wave travelling through the pipe 10 in the case of a closing of the supply valve is not correctly transmitted to the accumulator 12. This therefore generally leads to oversizing the accumulator 12.

Furthermore, according to this design, the accumulator 12 being connected via the connection duct 14 which is not coaxial with the fuel pipe, the direction of absorption therefore is consequently not optimized and is not able to dampen to the maximum a pressure wave travelling through the pipe 10 in the direction opposite the direction of fuel flow F.

The present disclosure overcomes these disadvantages by proposing an accumulator having an optimized absorption direction of the pressure wave travelling through the pipe.

Turning now to FIGS. 3-6, in accordance with the present disclosure, the accumulator 112 comprises a housing 116 which is coaxial with the pipe 110 and it comprises a permeable chamber 126 delimited at least partially by the housing 116, which stresses in pressure the deformable enclosure 118, i.e. it is likely to allow the fuel to stress an outer surface of the movable wall 120 of the deformable enclosure 118.

Figure 3:
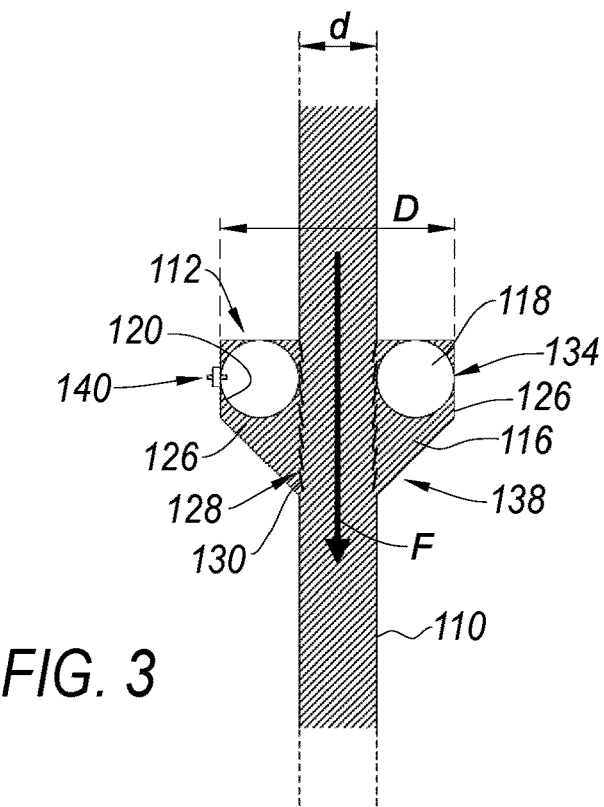
FIG. 3 is a schematic view of one representative embodiment of a fuel pipe comprising a fuel accumulator according to aspects of the present disclosure.
Figure 4:
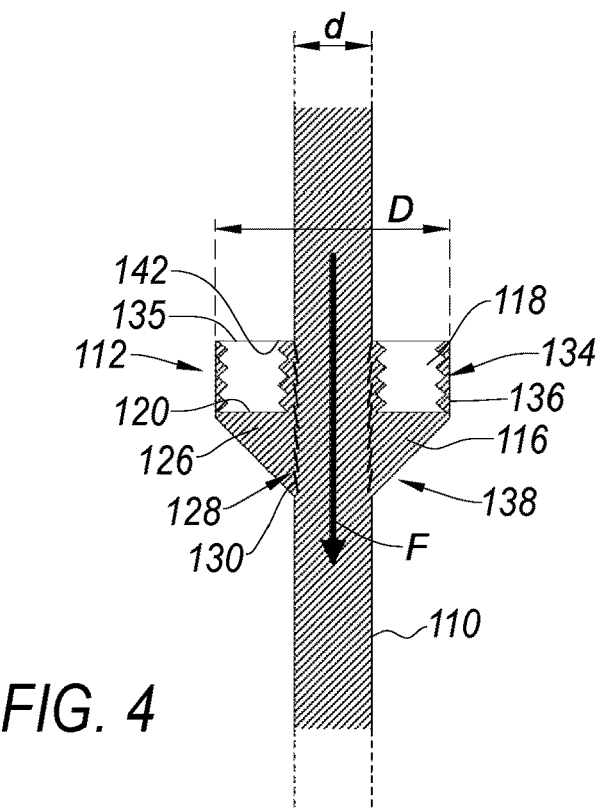
FIG. 4 is a schematic view of a second representative embodiment of a fuel pipe comprising a fuel accumulator according to aspects of the present disclosure.

In the first and second embodiments of the present disclosure which have been represented in FIGS. 3 and 4, the housing 116 delimits the permeable chamber 126 in the entirety thereof. In the third embodiment of the present disclosure which has been represented in FIG. 5, the housing 116 can only delimit an upstream portion, with respect to the normal direction of fuel flow F, of the permeable chamber 126.

In accordance with the present disclosure, the permeable chamber 126 is separated from the main fuel flow F via a grid 128 with staged walls 130 which are tilted, with respect to a direction of the main flow F flowing along the grid, substantially in the direction of the deformable enclosure 118.

This configuration is particularly advantageous, as it makes it possible for the main flow of fuel F, in normal operation, to flow along the grid 128 substantially without interacting with the permeable chamber 126 and without stressing the deformable enclosure 118. Therefore, the flow of the main fuel flow F is not disturbed by turbulences inside the permeable chamber 126.

Conversely, when the flow of fuel F is interrupted by the closing of the supply valve, the pressure wave that propagates in the pipe 110 in the opposite direction of the flow F in normal operation is channeled by the staged walls 130 towards the inside of the permeable chamber 126 such that it can stress the deformable enclosure 118 with full effectiveness.

Figure 6:
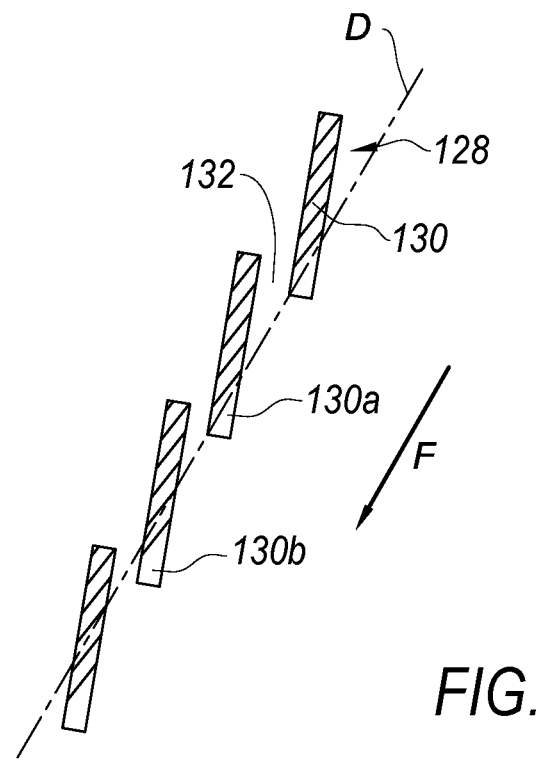
FIG. 6 is a detailed view of a grid with staged walls according to aspects of the present disclosure.

As illustrated in FIG. 6, the grid 128 locally has a general orientation P which is oriented parallel to the direction of the flow of fuel F. Each tilted wall 130, projecting over the direction of the main flow F flowing along the grid 128, or over the direction P of general orientation of the grid 128 that is parallel thereto, covers at least one adjacent tilted wall. Thus, FIG. 6 represents a wall 130a that, projecting over the direction D covers at least an adjacent wall 130b.

Each tilted wall 130, 130a thus delimits with the adjacent tilted wall 130, 130b an opening 132 which is rotated substantially in the direction of the deformable enclosure 118. This configuration advantageously makes it possible to orient the pressure wave resulting from the closing of the supply valve in the direction of the deformable enclosure 118.

In some embodiments, as illustrated in FIGS. 2 to 5, the deformable enclosure 118 has symmetry of rotation and is coaxial with the housing 116. This configuration ensures that the pressure wave stresses the deformable enclosure 118 evenly.

Advantageously, the housing 116 is formed of one part with the pipe 110.

In the first and second embodiments, which have been represented in FIGS. 3 and 4, the housing 116 is formed in a peripheral protrusion 134 with a tubular shape of the pipe 110 extending according to a diameter D greater than a main diameter d of the pipe 110.

More specifically, the protrusion 134 comprises an upstream portion 136, for example cylindrical, receiving the deformable enclosure and a downstream portion 138 that converges downstream until joining the first portion 136 at the pipe 110 with main diameter d. In a non-limiting manner of the present disclosure, this downstream portion 138 is truncated and the conicity thereof is substantially 30°.

The upstream 136 and downstream 138 portions thus delimit the permeable chamber 116. The presence of the downstream truncated portion 138 allows, on the one hand, to axially channel the pressure wave rising back in the pipe 110 in the direction opposite the flow F to the deformable enclosure 118 and, on the other hand, to prevent the accumulation of pollutants or of water in the permeable chamber 116.

In these first and second embodiments, at least the downstream portion 138 is separated from the main portion of the pipe by the grid with staged walls.

In some embodiments, the two upstream 136 and downstream 138 portions delimiting the permeable chamber 116 are separated from the main flow of fuel F by the grid 128 with staged walls 130 which extends axially along the entire housing 116 according to a cylinder with a diameter that corresponds to the main diameter d of the pipe 110. This configuration ensures that the deformable enclosure 118 is always stressed by the pressure wave rising back along the pipe 110 in the direction opposite the flow F, regardless of the compression of the deformable enclosure 118.

In the case where the deformable enclosure 118 has a known minimum volume, it could be considered that the grid 128 does not extend along this known minimum volume, but only over a portion and a rigid wall extends along this known volume, so as to form a well wherein the deformable enclosure 118 would be received in maximum compression position. For example, the grid 128 could extend along the downstream portion 138 and only over a portion of the upstream 136 swept by the deformable enclosure during the deformation thereof.

In the first embodiment of the present disclosure which has been represented in FIG. 3, the deformable enclosure 118 is comprised of a torus made of elastomer material that has a single continuous wall 120. At least one valve for inflating 140 said torus passes through the wall of the peripheral protrusion 134 on the upstream portion 136. In this embodiment, the pressure of the gas inside the torus can be adjusted by a suitable inflating using the valve 140.

In the second embodiment of the present disclosure which has been represented in FIG. 4, the deformable enclosure 118 comprises a metal bellows in the shape of a crown that comprises at least one first fixed annular wall 142, that coincides with an upstream wall 135 of the upstream portion 136, and a second movable annular wall 120 that is rotated towards the downstream portion 138 along the direction of the pipe 110. The first fixed annular wall 142 can be combined with the upstream wall 135, or added onto the latter.

The gas pressure inside the bellows is established prior to the mounting of the latter in the housing 116.

Figure 5:
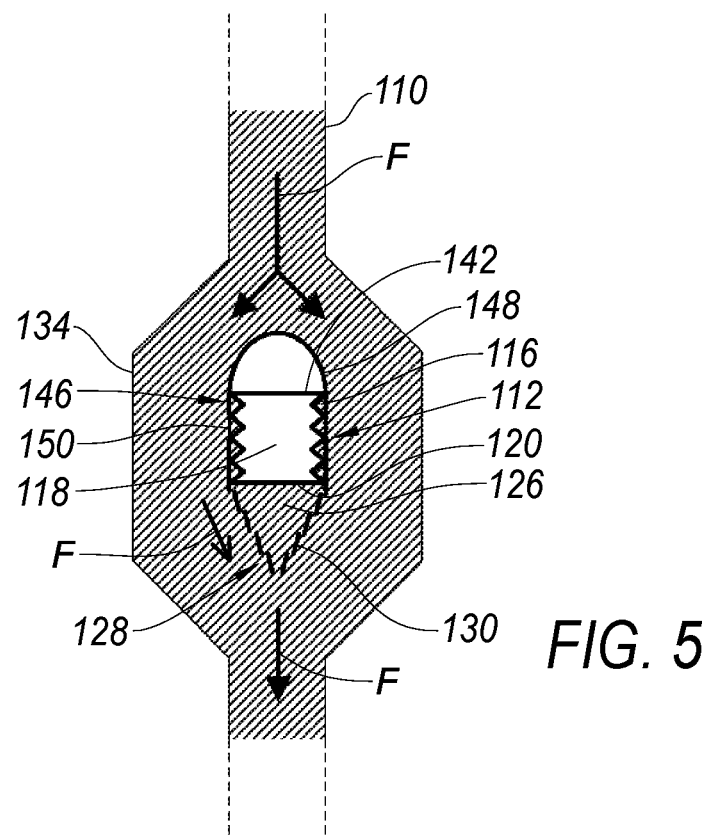
FIG. 5 is a schematic view of a third representative embodiment of a fuel pipe comprising a fuel accumulator according to aspects of the present disclosure.

According to the third embodiment of the present disclosure which has been represented in FIG. 5, the housing 116 of the accumulator 112 is always formed from a part with the pipe 110, but it does not form the entirety of the chamber 116 and is not peripheral, but centered in the pipe 110.

To this effect, the accumulator 112 comprises a casing 146 housed at the center of a peripheral protrusion 134 of the pipe. The casing 146 comprises an upstream segment 148 with, for example, an ogive shape, of which the conicity is rotated in the upstream direction, and which is coaxial with the pipe 110, and a cylindrical downstream segment 150 forming the housing 116 receiving the deformable enclosure 118.

The upstream segment 148 with an ogive shape allows distribution of the flow F such that it slides along the casing 146 without forming any turbulence.

The housing 116 is open in the downstream direction. It is closed by a grid 128 with staged walls 130 that converge downstream towards an axis of the pipe 110, from a downstream end 152 of the downstream segment 150. The grid 128 extends coaxially with the pipe 110 and is, for example, of a frustoconical shape. The permeable chamber 116 is therefore delimited for one portion by the casing 146 and for the other portion by the grid 128. As can be seen in FIG. 5, the flow of fuel F slides along the main direction of orientation of the grid 128.

In this embodiment, there is only one alternative embodiment of the deformable enclosure 116, which is made in the form of a cylindrical metal bellows that comprises at least one first fixed wall 142 integral with an upstream end of the cylindrical downstream segment 150 and a second movable wall 144 which is rotated towards the permeable chamber 126 along the direction of the pipe 110. Indeed, the deformable enclosure 116 being housed inside the pipe 110, it is desirable to shape the deformable enclosure 116 in the form of a metal bellows rather than a balloon that can be inflated only once before the mounting thereof.

It will be understood, that in some embodiments of the present disclosure, the pressure accumulator 112 forms part of the fuel pipe 110 with which it is formed of one single part. This configuration makes it possible to ensure the absence of a connection and consequently to prevent the risk of a leak.

The position of the pipe 110 thus formed in the fuel circuit of the turbine engine is provided in order to prevent any accumulation of deposits in the permeable chamber 116. To this effect, the accumulator 112 may be arranged in the circuit according to a position wherein one upstream end of the pressure accumulator 112 is arranged higher than a downstream end of said accumulator 112 such that any deposits are removed from the accumulator 112 by gravity. In this regard, the direction of the accumulator 112 will be vertical.

The present disclosure therefore proposes a simple and effective dampening of the pressure waves resulting from a supply shutdown of a turbine engine.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A fuel pressure accumulator for a fuel supply circuit of a turbine engine having a pipe in which a main flow of fuel flows from upstream to downstream, the fuel pressure accumulator comprising:

a housing configured to be positioned adjacent to the pipe and receive a deformable enclosure configured to confine, in a sealed manner, a gas subjected to a pressure equal to a nominal fuel pressure present in the pipe, the deformable enclosure comprising a movable wall configured to be arranged in contact with the fuel and to deform under the effect of a fuel overpressure such that the gas confined in the enclosure, by being compressed, dampens the fuel overpressure, wherein the housing is coaxial with the pipe; and a permeable chamber delimited at least partially by the housing, the permeable chamber pressurizing the deformable enclosure and communicating with the main flow of fuel by a grid having staged walls which are tilted substantially in the direction of the deformable enclosure with respect to a direction of the main flow flowing along the grid.

2. The fuel pressure accumulator of claim 1, wherein each tilted wall, projecting over the direction of the main flow flowing along the grid, covers at least one adjacent tilted wall and delimits with the adjacent tilted wall an opening rotated substantially in the direction of the deformable enclosure.

3. The fuel pressure accumulator of claim 2, wherein the deformable enclosure has a symmetry of rotation and is coaxial with the housing.

4. The fuel pressure accumulator of claim 1, wherein the housing is formed of a peripheral protrusion extending from a main portion of the pipe, the peripheral protrusion comprising an upstream portion receiving the deformable enclosure and having an outer diameter greater than a diameter of the main portion of the pipe, and a downstream portion having a wall that converges in the downstream direction until joining a wall of the main portion of the pipe, the upstream and downstream portions delimiting the permeable chamber, and at least the downstream portion of the peripheral protrusion being separated from the main portion of the pipe by the grid with staged walls.

5. The fuel pressure accumulator of claim 4, wherein the deformable enclosure has a symmetry of rotation, is coaxial with the housing, and comprises a torus made of elastomer material, and wherein at least one valve for inflating the torus passes through a wall of the peripheral protrusion.

6. The fuel pressure accumulator of claim 4, wherein the deformable enclosure has a symmetry of rotation, is coaxial with the housing, and comprises a metal bellows in the shape of a crown which comprises a fixed annular wall coinciding with an upstream wall of the upstream portion of the annular protrusion, the metal bellows further comprising a movable annular wall that is rotated towards the downstream portion.

7. The fuel pressure accumulator of claim 1, wherein said pressure accumulator comprises:
   a casing housed at the center of a peripheral protrusion of the pipe, said casing comprising an upstream segment with an ogive shape, of which the conicity is rotated upstream and which is coaxial with the pipe, and a cylindrical downstream segment forming the housing receiving the deformable enclosure; and
   the grid with staged walls, which extends coaxially with the pipe by converging downstream from a downstream end of the downstream segment of the casing and with which it delimits the permeable chamber.

8. The fuel pressure accumulator of claim 7, wherein the deformable enclosure comprises a cylindrical metal bellows that comprises a fixed wall integral with an upstream end of the downstream segment, and a movable wall which is rotated towards the permeable chamber.

9. A fuel pipe for a fuel supply circuit of a turbine engine having at least one pipe having a main fuel flow, upstream to downstream, wherein the fuel pipe comprises at least one pressure accumulator according to claim 1.

10. A fuel circuit for a turbine engine having at least one pipe, comprising:
   a fuel pipe having a main fuel flow, upstream to downstream, wherein the fuel pipe comprises a fuel pressure accumulator according to claim 1, wherein the at least one accumulator is arranged in the circuit according to a position wherein an upstream end of the pressure accumulator is arranged higher than a downstream end of the accumulator.

* * * * *